United States Patent [19]
Kurata et al.

[11] Patent Number: 5,274,053
[45] Date of Patent: Dec. 28, 1993

[54] PROCESS FOR PRODUCING THERMOPLASTIC RESIN

[75] Inventors: Takashi Kurata, Chiba; Yoichi Kamoshida; Yoshiaki Kawamura, both of Mie; Makoto Matsumoto, Tokyo; Junichiro Watanabe, Tokyo; Michio Zembayashi, Tokyo, all of Japan

[73] Assignees: Japan Synthetic Rubber Co., Ltd.; Toshiba Silicone Co., Ltd, both of Tokyo, Japan

[21] Appl. No.: 966,405

[22] Filed: Oct. 26, 1992

[30] Foreign Application Priority Data

Oct. 29, 1991 [JP] Japan .................. 3-308224

[51] Int. Cl.⁵ .......................................... C08F 283/12
[52] U.S. Cl. ........................... 525/479; 528/25; 528/26
[58] Field of Search .............. 525/479, 63; 528/25, 528/26

[56] References Cited

U.S. PATENT DOCUMENTS

| | | | |
|---|---|---|---|
| 4,690,986 | 9/1987 | Sasaki et al. | 525/479 |
| 4,918,132 | 4/1990 | Hongo et al. | 525/479 |
| 5,147,947 | 9/1992 | Yamamoto et al. | 525/479 |

FOREIGN PATENT DOCUMENTS

| | | |
|---|---|---|
| 0159715 | 10/1985 | European Pat. Off. |
| 367219 | 5/1990 | European Pat. Off. |

*Primary Examiner*—Ralph H. Dean
*Attorney, Agent, or Firm*—Oblon, Spivak, McClelland, Maier & Neustadt

[57] ABSTRACT

A process for producing a thermoplastic resin which comprises graft-polymerizing at least one vinyl monomer (IV) onto a modified polyorganosiloxane (III) obtained by condensation of from 90 to 99.8% by weight of an organosiloxane (I) having a structural unit represented by the formula $R^1_n SiO_{(4-n)/2}$, wherein $R^1$ represents a substituted or unsubstituted monovalent hydrocarbon group and n is an integer of from 0 to 3, and from 10 to 0.2% by weight of a graft crosslinking agent (II) having a modified alkoxysilane structure.

11 Claims, No Drawings

PROCESS FOR PRODUCING THERMOPLASTIC RESIN

FIELD OF THE INVENTION

The present invention relates to a process for producing a polyorganosiloxane-based thermoplastic resin having a vinyl monomer graft polymerized efficiently therein, having markedly excellent sliding properties, abrasion resistance, cold resistance, and impact resistance.

BACKGROUND OF THE INVENTION

A technique of modifying the resins with rubbers has conventionally been established to improve an impact strength of thermoplastic resins.

Examples of resins produced by the modification technique include ABS (Acrylonitrile-Butadiene-Styrene) resins obtained by reinforcing styrene-acrylonitrile copolymer resins (AS resins) with butadiene rubber and AAS resins obtained by reinforcing AS resins with an acrylic rubber. Although a silicone rubber may be thought to be usable as such a base rubber component, compositions obtained by merely blending thermoplastic resins with the silicone rubber have insufficient impact resistance because in such compositions which are a mere blend of a thermoplastic resin and a polyorganosiloxane, the two components show poor compatibility with each other. This problem may be overcome if the technique of grafting a vinyl monomer onto a rubber as ABS resins can be applied to modification with a polyorganosiloxane. However, polyorganosiloxanes generally have poor reactivity with vinyl monomers and it is difficult to obtain graft copolymers therefrom.

Various methods are disclosed for the production of a graft copolymer of the above kind. For example, JP-A-50-109282 proposes to polymerize a vinyl monomer in the presence of a polyorganosiloxane containing a vinyl group or allyl group, thereby to produce a graft copolymer having improved impact strength. (The term "JP-A" as used herein means an "unexamined published Japanese patent application".)

JP-A-52-130885 proposes to use a mercapto group-containing polyorganosiloxane in place of the vinyl or allyl group-containing polyorganosiloxane, thereby to improve the impact strength of vinyl polymers.

Further, JP-A-60-252613, JP-A-61-106614, and JP-A-61-136510 propose to polymerize a vinyl monomer in an emulsion of a polyorganosiloxane containing an acrylic group or methacrylic group, thereby to obtain a graft copolymer having excellent impact strength with a high graft efficiency.

However, the polymerization using either a polyorganosiloxane containing a vinyl or allyl group or a polyorganosiloxane containing a mercapto group has a drawback that these polyorganosiloxanes have poor graft reactivity with a vinyl monomer and, hence, the polymerization product is low in apparent graft ratio, which is calculated from the amount of gel formed and which indicates the proportion of the amount of a vinyl polymer grafted on the polyorganosiloxane to the amount of the polyorganosiloxane.

Therefore, an interfacial adhesive strength between the polyorganosiloxanes and the vinyl polymer is low and delamination is remarkable. The graft copolymer obtained, therefore, has a problem that it cannot have good appearance or sufficient impact strength.

On the other hand, when a polyorganosiloxane containing an acrylic or methacrylic group is used, the graft copolymer having an improved impact strength is obtained, but gloss is low and a sufficient appearance cannot be obtained.

SUMMARY OF THE INVENTION

The present invention has been made to overcome the above-described problems of the prior art techniques.

Accordingly, an object of the present invention is to provide a process for producing a polyorganosiloxane-based thermoplastic resin having excellent weatherability, cold resistance, sliding properties, and abrasion resistance with an excellent graft reactivity.

The present invention provides a process for producing a thermoplastic resin which comprises graft-polymerizing at least one vinyl monomer (IV) (hereinafter occasionally referred to as "component (IV)") onto a modified polyorganosiloxane (III) (hereinafter occasionally referred to as "component (III)") obtained by condensation of from 90 to 99.8% by weight of an organosiloxane (I) (hereinafter occasionally referred to as "component (I)") having a structural unit represented by the formula $R^1{}_n SiO_{(4-n)/2}$, wherein $R^1$ represents a substituted or unsubstituted monovalent hydrocarbon group and n is an integer of from 0 to 3, and from 10 to 0.2% by weight of a graft crosslinking agent (II) (hereinafter occasionally referred to as "component (II)") having a modified alkoxysilane structure formed by bonding at least one compound selected from the group consisting of an azo compound, a dialkyl disulfide compound, a norbornene compound, an ethylidenenorbornene compound, a dicyclopentadiene compound, a dicyclopentenyl compound, an indene compound, a hexadiene compound, a maleimide compound, and an acrylamide compound with an alkoxysilane directly or indirectly through an alkylene group or an organic group containing a hetero-atom selected from the group consisting of O, S, and N, the sum of component (I) and component (II) being 100% by weight.

The present invention further provides a process for producing a thermoplastic resin which comprises graft-polymerizing at least one vinyl monomer (IV) onto a modified polyorganosiloxane (III) having a weight-average molecular weight of 300,000 or more and obtained by condensation of from 90 to 99.8% by weight of an organosiloxane (I) having a structural unit represented by the formula $R^1{}_n SiO_{(4-n)/2}$, wherein $R^1$ represents a substituted or unsubstituted monovalent hydrocarbon group and n is an integer of from 0 to 3, and from 10 to 0.2% by weight of a graft crosslinking agent (II) having a modified alkoxysilane structure formed by chemically bonding a mercapto compound with an alkoxysilane, the sum of component (I) and component (II) being 100% by weight.

DETAILED DESCRIPTION OF THE INVENTION

The organosiloxane (I) used in the present invention has a structural unit represented by the formula described above. This organosiloxane (I) may have a straight-chain, branched, or cyclic structure, but preferably has a cyclic structure.

Examples of the substituted or unsubstituted monovalent hydrocarbon group contained in the organosiloxane (I) include methyl group, ethyl group, propyl group, vinyl group, phenyl group, and substituted hydrocarbon groups formed by substituting these groups with a halogen atom or a cyano group.

In the formula described above, n is an integer of from 0 to 3.

Specific examples of the organosiloxane (I) include cyclic organosiloxanes such as hexamethylcyclotrisiloxane, octamethylcyclotetrasiloxane, decamethylcyclopentasiloxane, dodecamethylcyclohexasiloxane, and trimethyltriphenylcyclotrisiloxane. Examples thereof further include straight-chain or branched organosiloxanes.

The organosiloxane (I) may be a previously condensated polyorganosiloxane having a weight-average molecular weight of from about 500 to 10,000 calculated as a polystyrene.

Where the organosiloxane (I) is a polyorganosiloxane, the terminal of the molecular chain may be blocked by, for example, a hydroxyl group, alkoxy group, trimethylsilyl group, dimethylvinylsilyl group, methylphenylvinylsilyl group, methyldiphenylsilyl group, or the like.

The graft crosslinking agent (II) used in the present invention has a modified alkoxysilane structure formed by bonding at least one compound selected from the group consisting of azo compounds represented by the formula R—N=N—R' wherein R and R' which are the same or different each represents an alkyl group having from 1 to 10 carbon atoms or an aryl group, dialkyl disulfide compounds represented by the formula R—S—S—R' wherein R and R' are the same as defined above, norbornene compounds represented by the formula

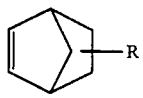

ethylidenenorbornene compounds represented by the formula

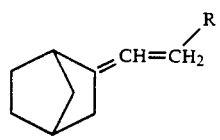

dicyclopentadiene compounds represented by the formula

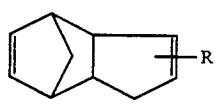

indene compounds represented by the formula

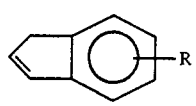

hexadiene compounds represented by the formula

maleimide compounds represented by the formula

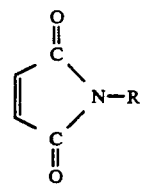

acrylamide compounds represented by the formula

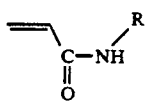

and dicyclopentenyl compounds represented by the formula

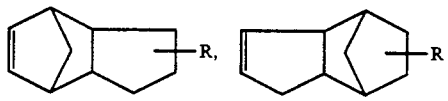

with an alkoxysilane directly or indirectly through an alkylene group or an organic group containing a heteroatom selected from the group consisting of O, S, and N. Particularly preferred examples of the compound to be reacted with the alkoxysilane are the azo compounds, norbornene compounds, maleimide compounds, and mercapto compounds.

The present invention can also use the graft crosslinking agent having a modified alkoxysilane structure formed by chemically bonding a mercapto compound represented by the formula HS—R" wherein R" represents an organic group having from 1 to 10 carbon atoms, with an alkoxysilane. Where this graft crosslinking agent is used, graft reactivity between the modified polyorganosiloxane and the vinyl monomer is slight low and impact resistance of the thermoplastic resin obtained tends to be poor. Therefore, it is necessary for the modified polyorganosiloxane (III) used to have a weight average molecular weight calculated as a polystyrene of 300,000 or more, preferably 500,000 or more. This graft crosslinking agent (the mercapto compound and alkoxysilane are chemically bonded) can be used in combination with the above-described graft crosslinking agent.

Specific examples of the graft crosslinking agent (II) include 2-azoisobutyronitrile-2-cyanopropylmethyldimethoxysilane of the formula

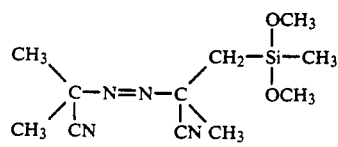

, 2-(trimethylthiuramdisulfide)ethylmethyldimethoxysilane of the formula

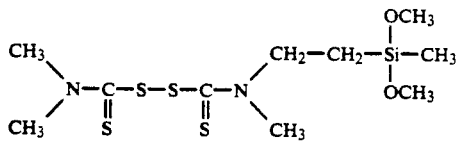

2-(5-norbornenyl)ethylmethyldimethoxysilane of the formula

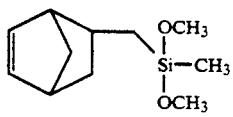

ethylidenenorbornenylmethyldimethoxysilane of the formula

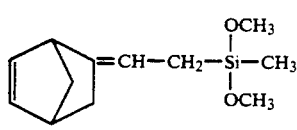

dicyclopentadienylethylmethldimethoxysilane of the formula

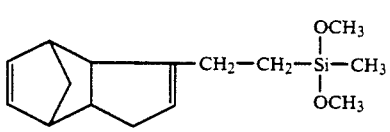

indenylmethyldimethoxysilane of the formula

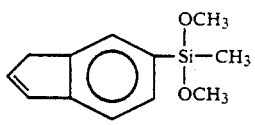

1,4-hexadienylmethyldimethoxysilane of the formula

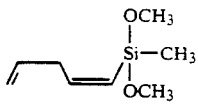

p-maleimidenylphenylmethyldimethoxysilane of the formula

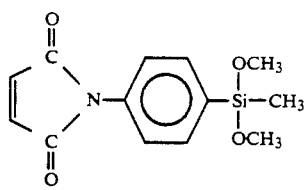

acrylamidenylmethyldimethoxysilane of the formula

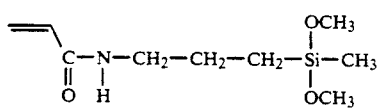

γ-mercaptopropylmethyldimethoxysilane of the formula

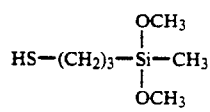

and dicyclopentenylmethyldimethoxysilane of the formula

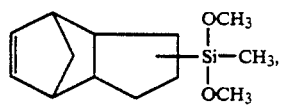

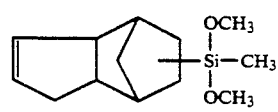

The amount of the graft crosslinking agent (II) used is from 0.2 to 10% by weight, preferably from 0.5 to 5% by weight, based on the total weight of components (I) and (II). If the amount of component (II) used is below 0.2% by weight, a high graft ratio cannot be obtained in the graft polymerization of the thus-obtained modified polyorganosiloxane (III) and the vinyl monomer (IV). As a result, the interfacial adhesive strength between the modified polyorganosiloxane (III) and the vinyl polymer grafted thereon is decreased, thereby causing delamination, and a graft copolymer (hereinafter referred to as "graft copolymer (V)") having a sufficient impact strength cannot be obtained.

On the other hand, if the amount of the graft crosslinking agent (II) used exceeds 10% by weight, the graft ratio is increased, but the degree of polymerization of the grafted vinyl polymer is reduced with the increase of the graft crosslinking agent (II) to reduce the molecular weight of the vinyl polymer. As a result, a sufficient impact strength cannot be obtained.

The modified polyorganosiloxane (III) can be carried out by mixing, with shearing, the organosiloxane (I) with the graft crosslinking agent (II) in the presence of an emulsifying agent such as an alkylbenzenesulfonic acid or the like using a homomixer or the like, followed by condensation. This emulsifying agent not only functions as an emulsifying agent for the organosiloxane (I) but also serves as a condensation initiator.

The amount of the emulsifying agent used is usually from about 0.1 to 5% by weight, preferably from about 0.3 to 3% by weight, based on the total weight of components (I) and (II). In this case, water is used and the amount thereof is usually from 100 to 500 parts by weight, preferably from 200 to 400 parts by weight, per 100 parts by weight of the sum of components (I) and (II).

The condensation temperature is usually from 5° to 100° C.

In the case of producing the modified polyorganosiloxane (III), a crosslinking agent can be added as a third component to improve the impact resistance of the resin obtained. Examples of the crosslinking agent include trifunctional crosslinking agents such as methyltrimethoxysilane, phenyltrimethoxysilane, and ethyltriethoxysilane, and tetrafunctional crosslinking agents such as tetraethoxysilane. The amount of the crosslinking agent added is usually about 10% by weight or less, preferably about 5% by weight or less, based on the total weight of the organosiloxane (I) and the graft crosslinking agent (II).

The thus-obtained modified polyorganosiloxane (III) has a weight-average molecular weight calculated as a polystyrene of preferably about 300,000 or higher, more preferably from about 400,000 to 1,000,000. However, as described above, where the graft crosslinking agent having a modified alkoxysilane structure formed by chemically bonding the mercapto compound with the alkoxysilane is used, the modified polyorganosiloxane (III) used must have a weight average molecular weight calculated as a polystyrene of 300,000 or more, preferably 500,000 or more.

By graft polymerizing the vinyl monomer (IV) onto the modified polyorganosiloxane (III) thus obtained, the thermoplastic resin of the present invention containing the graft copolymer (V) can be obtained.

Examples of the vinyl monomer (IV) used in the present invention include aromatic alkenyl compounds such as styrene, α-methylstyrene, and sodium styrenesulfonate; methacrylic esters such as methyl methacrylate, ethyl methacrylate, 2-ethylhexyl methacrylate, butyl methacrylate, and allyl methacrylate; acrylic esters such as methyl acrylate, ethyl acrylate, butyl acrylate, hydroxyethyl acrylate, and dimethylaminoethyl acrylate; vinyl cyanide compounds such as acrylonitrile and methacrylonitrile; olefins such as ethylene and propylene; conjugated dienes such as butadiene, isoprene, and chloroprene; and other compounds such as vinyl acetate, vinyl chloride, vinylidene chloride, triallyl isocyanurate, acrylic acid, methacrylic acid, N-phenylmaleimide, N-cyclohexylmaleimide, and maleic anhydride. These can be used alone or as a mixture of two or more thereof.

Of these vinyl monomers (IV), a monomer mixture containing from 65 to 75% by weight of styrene and from 35 to 25% by weight of acrylonitrile is preferred from the standpoint of further improving the impact resistance of the thermoplastic resin of the present invention.

In conducting the graft polymerization of a vinyl monomer (IV) onto the modified polyorganosiloxane (III), the amount of component (III) charged is from 5 to 80% by weight, preferably from 10 to 60% by weight, and the amount of component (IV) charged is from 95 to 20% by weight, preferably from 90 to 40% by weight, the sum of components (III) and (IV) being 100% by weight.

If the amount of component (III) used is below 5% by weight, sufficient impact strength cannot by obtained. On the other hand, if the amount of component (III) used is larger than 80% by weight, the amount of the vinyl polymer grafted onto component (III) is decreased, and a sufficient interfacial adhesive strength cannot be obtained between the modified polyorganosiloxane (III) and the vinyl polymer. As a result, the thermoplastic resin thus obtained has poor appearance and impact strength.

The graft ratio of the graft copolymer (V) thus obtained is usually about 20% or higher, preferably about 80% or higher, more preferably about 100% or higher. Thus, when the graft ratio of the graft copolymer (V) is high as above, the interfacial adhesive strength between the graft copolymer and the vinyl polymer which was not directly grafted thereto is increased, and as a result, the modified polyorganosiloxane (III) is uniformly dispersed in the vinyl polymer. As a result, a thermoplastic resin having good appearance and excellent impact strength can be obtained.

The thermoplastic resin thus obtained has a molecular weight such that the intrinsic viscosity of the methyl ethyl ketone-soluble part of the resin, as measured in methyl ethyl ketone at 30° C., is preferably from 0.2 to 0.8, more preferably from 0.3 to 0.7, most preferably from 0.4 to 0.6.

In addition to the graft copolymer (V) thus obtained, the thermoplastic resin of the present invention further contains a vinyl polymer which is an ungrafted polymer of the vinyl monomer (IV). The content of the graft copolymer (V) in the thermoplastic resin is usually 5% by weight or more, preferably 10% by weight or more, based on the weight of the thermoplastic resin or a composition comprising the thermoplastic resin and other polymers blended therewith.

In the production of the thermoplastic resin of the present invention, the vinyl monomer (IV) is graft-polymerized onto the modified polyorganosiloxane (III) by a conventional radical polymerization to obtain the thermoplastic resin as a composition containing the graft copolymer (V).

In this case, according to the kind of a radical polymerization initiator used, it is necessary to neutralize a latex of the modified polyorganosiloxane (III) which is acidic by an alkylbenzenesulfonic acid or the like as described above with an alkali. Examples of the alkali include sodium hydroxide, potassium hydroxide, sodium carbonate, sodium hydrogen carbonate, triethanolamine, and triethylamine.

Examples of the radical polymerization initiator include redox initiators which are combinations of an oxidizing agent comprising an organic hydroperoxide, such as cumene hydroperoxide, diisopropylbenzene hydroperoxide, or p-methane hydroperoxide, and a reducing agent such as a saccharose-containing iron pyrophosphate composition, a sulfoxylate composition, or a mixed composition of a saccharose-containing iron pyrophosphate composition and a sulfoxylate composition; persulfates such as potassium persulfate and ammonium persulfate; azo compounds such as azobisisobutyronitrile, dimethyl 2,2,-azobisisobutyrate, and 2-carbamoylazaisobutyronitrile; and organic peroxides such as benzoyl peroxide and lauroyl peroxide. Preferred of these are redox initiators.

The amount of the radical polymerization initiator used is usually from about 0.05 to 5 parts by weight, preferably from about 0.1 to 3 parts by weight, per 100 parts by weight of the vinyl monomer (IV) used.

In this case, it is preferred that this radical polymerization is performed by an emulsion polymerization method or a solution polymerization method.

In conducting the emulsion polymerization, a conventional emulsifying agent, the above-described radical polymerization initiator, a chain transfer agent, and the like can be used.

Examples of the emulsifying agent include anionic emulsifying agents such as sodium dodecylbenzenesulfonate, sodium lauryl sulfate, sodium (diphenyl ether)disulfonate, and sodium (dialkyl succinate)sulfonates, and nonionic emulsifying agents such as polyoxyethylene alkyl esters and polyoxyethylene alkylaryl ethers. These emulsifying agents can be used alone or in combination of two or more thereof.

The amount of emulsifying agent used is usually from about 0.5 to 5% by weight based on the weight of the vinyl monomer (IV) used.

Examples of the chain transfer agent include mercaptans such as t-dodecyl mercaptan, octyl mercaptan, n-tetradecyl mercaptan, and n-hexyl mercaptan, and halogen compounds such as carbon tetrachloride and ethylene bromide.

The amount of the chain transfer agent is usually from 0.02 to 1% by weight based on the weight of the vinyl monomer (IV).

The emulsion polymerization is conducted at a polymerization temperature of from 5° to 100° C., preferably from 50° to 90° C., for a polymerization time of from 0.1 to 10 hours using the above-described radical polymerization initiator, emulsifying agent, chain transfer agent and the like in the amounts defined above together with water in an amount of usually from 100 to 500 parts by weight per 100 parts by weight of the vinyl monomer (IV) and, if required and necessary, various electrolytes, pH controlling agents, etc.

The emulsion polymerization can be carried out by adding the vinyl monomer (IV) and the radical polymerization initiator to the latex containing the modified polyorganosiloxane (III) obtained by the condensation of the organosiloxane (I) and the graft crosslinking agent (II).

In the case of solution polymerization, on the other hand, the modified polyorganosiloxane (III) and the vinyl monomer (IV) are dissolved in an organic solvent and the radical polymerization is conducted by adding the radical polymerization initiator and, if required, the chain transfer agent and various additives to the solution.

Examples of the organic solvent used for the solution polymerization include toluene, n-hexane, cyclohexane, chloroform, and tetrahydrofuran.

The solution polymerization is conducted at a polymerization temperature of from 5° to 150° C., preferably from 50° to 130° C., for a polymerization time of from 1 to 10 hours using the radical polymerization initiator and, if necessary, the chain transfer agent and the like in the amounts as defined above together with, usually, an organic solvent in an amount of from 80 to 500 parts by weight per 100 parts by weight of the vinyl monomer (IV).

In the case of the solution polymerization, impurities can be greatly reduced as compared with the case of the emulsion polymerization.

Where the thermoplastic resin of the present invention is produced by the emulsion polymerization, the product is coagulated by a conventional salting out method and the powdery product thus obtained is purified by washing with water, followed by drying.

Where solution polymerization is employed to produce a thermoplastic resin, the unreacted monomer and the solvent are removed from the reaction mixture by steam distillation and the resulting resin mass is finely pulverized and dried for purification.

The thermoplastic resin of the present invention containing the graft copolymer (V) obtained by the above-described each method is pelletized using a kneading machine such as an extruder.

In this case, according to the required performance, other conventional polymer can be suitably blended with the thermoplastic resin in an amount of usually about 99% by weight or less, preferably about 90% by weight or less, based on the total weight of the thermoplastic resin and the other polymer, and the resulting thermoplastic resin may be used as a thermoplastic resin composition.

Examples of the other polymers which can be used include diene-based rubbers such as polybutadiene, butadiene-styrene copolymers, acrylonitrile-butadiene copolymers, polyisoprene, and natural rubber; olefin-based rubbers such as acrylic rubbers, ethylene-propylene copolymers, ethylene-propylene-diene copolymers, chlorinated butyl rubbers, and chlorinated polyethylenes; aromatic vinyl-conjugated diene-based block copolymers such as styrene-butadiene block copolymers, styrene-butadiene-styrene block copolymers, and styrene-butadiene-styrene radial teleblock copolymers; hydrogenation products of the above block copolymers; and other polymers such as polypropylene, polyethylene, polystyrene, styrene-acrylonitrile copolymers, rubber-reinforced polystyrenes (HIPS), acrylonitrilebutadiene-styrene resins (ABS resins), acrylonitrileethylene-propylene-styrene resins (AES resins), methyl methacrylate-butadiene-styrene resins (MBS resins), acrylonitrile-butadiene-methyl methacrylate-styrene resins, acrylonitrile-n-butyl acrylate-styrene resins (AAS resins), poly(vinyl chloride), polycarbonates, poly(ethylene terephthalate), poly(butylene terephthalate), polyacetals, polyamides, epoxy resins, poly(vinylidene fluoride), polysulfones, ethylene-vinyl acetate copolymers, polyphenylene sulfide resins (PPS resins), polyetheretherketones, polyphenylene oxide resins (PPO resins), styrene-methyl methacrylate copolymers, styrene-maleic anhydride copolymers, rubber-modified PPO resins, styrene-maleimide-based copolymers, rubber-modified styrene-maleimide-based copolymers, polyamide-type elastomers, and polyester-type elastomers.

The pelletized thermoplastic resin (composition) can be processed and formed into a desired shape by any of conventional techniques such as compression molding, injection molding, and the like.

As described above, the thermoplastic resin of this invention contains the graft copolymer formed by graft polymerizing a vinyl monomer to the modified polyorganosiloxane having bonded thereto a specific graft crosslinking agent, so that the graft polymerization of the vinyl monomer tends to occur as compared with the case of using a conventional polyorganosiloxane and the graft copolymer contained therein is formed with very high graft ratio and graft efficiency. Therefore, the thermoplastic resin of this invention containing the graft copolymer or the thermoplastic resin composition of this invention composed of the thermoplastic resin and other polymer resin is excellent in the balance of physical properties.

In particular, the thermoplastic resin or the thermoplastic resin composition has excellent cold resistance, weather resistance, slidability, and abrasion resistance. Of those properties, the slidability and abrasion resistance of the thermoplastic resin or the resin composition are higher than those of polyacetal and polyamide which are known as a sliding materials. Further, other properties of the resin or resin composition are equal or superior to those of an ABS resin which is known to have balanced properties.

Since the thermoplastic resin or the thermoplastic resin composition of this invention has the excellent properties as described above, the resin or the resin composition can be applied to new fields such as sliding parts, parts for cold district, outdoor parts, etc., and the industrial significance thereof is very large.

The present invention will be explained below in more detail with reference to the following examples, but the invention is not construed as being limited thereto. In the examples, all parts and percents are by weight unless otherwise indicated.

In the examples, various measurement items were obtained by the following methods.

That is, condensation ratio, weight-average molecular weight, and graft ratio were determined by the following methods.

Condensation Ratio

The solids component in an emulsion was dried on a hot plate and the condensation ratio was calculated using the following equation:

Condensation Ratio (%) =

[(Amount of the solids component)/(Amount of the monomer charged)] × 100

Weight-Average Molecular Weight

Molecular weight was measured by GPC and expressed in terms of weight-average molecular weight calculated as a polystyrene.

Graft Ratio

A certain weight (X) of a graft polymerization product was introduced in acetone and this mixture was shaken with a shaker for 2 hours to dissolve a free copolymer. The resulting mixture was centrifuged for 30 minutes using a centrifugal separator at a revolution speed of 23,000 rpm to obtain an insoluble matter. This insoluble matter was then dried at 120° C. for 1 hour using a vacuum dryer and the weight (Y) of the dried insoluble matter was measured. The graft ratio was calculated using the following equation.

Graft Ratio =

$\{[(Y) - (X) \times$ (content of component (III) in the graft polymerization product)]/[(X) × (content of component (III) in the graft polymerization product)]$\} \times 100$ (%)

Further, properties of thermoplastic resins (thermoplastic resin compositions) were evaluated according to Evaluation Methods (A) (Table 1) and Evaluation Methods (B) shown below.

TABLE 1

| Property | Evaluation Methods (A) | | |
|---|---|---|---|
| | Unit | Test method | Condition |
| Izod impact strength (notched) | kg · cm/cm | ASTM-D256 | ¼", 23° C. |
| | | | ¼", −30° C. |
| Gloss | % | ASTM-D523 | 45° C. |

Evaluation Method (B)

Falling Weight Impact Strength

An impact rod having a top curvature R of ½" was left fall from a height of 50 cm using an impact tester made by Du Pont and the falling weight impact strength of each molded product having a thickness of 3.2 mm was measured. The unit was kg·cm.

Sliding Property

A frictional rubbing test was made using a Suzuki type slide tester, and as a material to be rubbed with the product, steel (S45C) was used. A test piece was a hollow cylindrical piece having an outer diameter of 25.6 mm and an inner diameter of 20.0 mm, and the form of the material to be rubbed with the test piece was the same as the test piece.

The kinetic friction coefficient was measured in an atmosphere at 23° C. and 50% RH under a load of 5 kg and a running speed of 3.75 cm/sec.

The kinetic friction coefficient was calculated by the following equation.

$$\mu = \frac{3 \times F \times (r_2^2 - r_1^2)}{P \times (r_2^3 - r_1^3)}$$

In the above equation, $\mu$ represents a kinetic friction coefficient, F represents a force given to the load cell, P represents a load, R represents an arm length upto the load cell, $r_1$ represents an inner diameter, and $r_2$ represents an outer diameter.

Specific abrasion loss was measured in an atmosphere of 23° C. and 50% RH; at a load of 5 kg, a running speed of 3.75 cm/sec., and 12,600 rounds (running distance 0.24 km) in the case of using the same material as the sample as the material to be rubbed with the sample, and at a load of 10 kg, a running speed of 15 cm/sec., and 80,000 rounds (running distance 6 km) in the case of using steel as the material to be rubbed with the sample.

The specific abrasion loss was calculated by the following equation:

$$A = \frac{\Delta W}{P \times l \times \alpha}$$

wherein A represents a specific abrasion loss, $\Delta W$ is a weight change of a sample, P is a load, l is a running distance, and $\alpha$ is the density of a sample.

Weather Resistance Test Method

After exposing each sample of 200 hours using a sun shine weather meter (Type WE-USN-HC, made by Toyo Rika K. K.) (exposure conditions: 63° C., sometimes rain), Izod impact strength was measured.

REFERENCE EXAMPLE

Each of the various graft crosslinking agents shown in Tables 2 to 4 was mixed with octamethylcyclotetrasiloxane in an amount as shown in the tables. These mixtures each was poured into 300 parts of distilled water having 2.0 parts of dodecylbenzenesulfonic acid dissolved therein. The resulting mixtures each was agitated for 3 minutes with a homomixer to obtain an emulsion. Each emulsion was transferred to a separable flask equipped with a condenser, nitrogen inlet, and stirrer, and the emulsion was heated at 90° C. for 6 hours with stirring and then kept being cooled at 5° C. for 24 hours, thereby to complete condensation.

The condensation ratio of the octamethylcyclotetrasiloxane in each of the thus-obtained modified polyorganosiloxanes (III) is shown in Tables 2 to 4.

TABLE 2

| Components used for preparing Component (III) (parts) | Components (III) | | | | | |
|---|---|---|---|---|---|---|
| | A-1 | A-2 | A-3 | A-4 | A-5 | A-6 |
| Component (I) | | | | | | |
| Octamethyltetracyclosiloxane | 98.5 | 98.5 | 98.5 | 98.5 | 98.5 | 98.5 |
| Component (II) | | | | | | |
| 2-Azoisobutyronitrile-2-cyanopropylmethyldimethoxysilane | 1.5 | — | — | — | — | — |
| 2-(Trimethylthiuram disulfide)ethylmethyldimethoxysilane | — | 1.5 | — | — | — | — |
| Norbornenylethylmethyldimethoxysilane | — | — | 1.5 | — | — | — |
| Ethylidenenorbornenylmethyldimethoxysilane | — | — | — | 1.5 | — | — |
| Dicyclopentadienylethylmethyldimethoxysilane | — | — | — | — | 1.5 | — |
| Indenylmethyldimethoxysilane | — | — | — | — | — | 1.5 |
| Hexadienylmethyldimethoxysilane | — | — | — | — | — | — |
| p-Maleimidenylphenylmethyldimethoxysilane | — | — | — | — | — | — |
| Condensation Ratio (%) | 98.0 | 98.1 | 98.0 | 98.0 | 98.2 | 98.1 |

TABLE 3

| Components used for preparing Component (III) (parts) | Components (III) | | | | | |
|---|---|---|---|---|---|---|
| | A-7 | A-8 | A-9 | A-10 | A-11 | A-12 |
| Component (I) | | | | | | |
| Octamethyltetracyclosiloxane | 98.5 | 98.5 | 98.5 | 100 | 99.9 | 70.0 |
| Component (II) | | | | | | |
| 2-Azoisobutyronitrile-2-cyanopropylmethyldimethoxysilane | — | — | — | — | 0.1 | 30 |
| Norbornenylethylmethyldimethoxysilane | — | — | — | — | — | — |
| Ethylidenenorbornenylmethyldimethoxysilane | — | — | — | — | — | — |
| Dicyclopentadienylethylmethyldimethoxysilane | — | — | — | — | — | — |
| Indenylmethyldimethoxysilane | — | — | — | — | — | — |
| Hexadienylmethyldimethoxysilane | 1.5 | — | — | — | — | — |
| p-Maleimidenylphenylmethyldimethoxysilane | — | 1.5 | — | — | — | — |
| Acrylamidenylpropylmethyldimethoxysilane | — | — | 1.5 | — | — | — |
| Condensation Ratio (%) | 98.0 | 98.1 | 98.0 | 98.0 | 98.0 | 98.0 |

TABLE 4

| Components used for preparing Component (III) (parts) | Components (III) | | |
|---|---|---|---|
| | B-1 | B-2 | B-3 |
| Component (I) | | | |
| Octamethyltetracyclosiloxane | 98.5 | 98.5 | 98.5 |
| Component (II) | | | |
| γ-Mercaptopropylmethyldimethoxysilane | 1.5 | 1.5 | 1.5 |
| Weight-average Molecular Weight (× 10000) | 52 | 32 | 20 |
| Condensation Ratio (%) | 98.1 | 98.0 | 98.0 |

EXAMPLES 1 TO 11 AND COMPARATIVE EXAMPLES 1 TO 4

Each of modified polyorganosiloxane latexes obtained in Reference Example was neutralized with aqueous sodium carbonate solution to adjust the pH of the latex to 7.

35 Parts, in terms of the amount of solid matter, of each of the modified polyorganosiloxane latexes was mixed with 0.5 part of sodium dodecylbenzenesulfonate and 140 parts of distilled water. This mixture was introduced into a separable flask equipped with a dropping bottle, condenser, nitrogen inlet, and stirrer. Thereto were then added 15.81 parts of styrene, this amount being 34% of the total styrene amount, 6.29 parts of acrylonitrile, this amount being 34% of the total acrylonitrile amount, 0.2 part of sodium pyrophosphate, 0.25 part of dextrose, 0.004 part of ferrous sulfate, and 0.074 part of cumene hydroperoxide. The contents in the flask were heated to 70° C. in a nitrogen stream to proceed polymerization for 1 hour. Thereafter, a liquid mixture of the styrene remainder in an amount of 30.69 parts, the acrylonitrile remainder in an amount of 12.21 parts, 1.084 parts of sodium dodecylbenzenesulfonate, 42 parts of distilled water, 0.12 part of cumene hydroperoxide, and 0.06 part of t-dodecyl mercaptan was added to the reaction mixture using the dropping bottle over a period of 3 hours. After completion of the addition, the polymerization reaction was further conducted for 1 hour and the reaction mixture was then cooled.

Each of the thus-obtained graft copolymer latexes was poured into warm water containing 2 parts, per 100 parts of the solid matter of the graft copolymer latex, of calcium chloride dihydrate dissolved therein, thereby to coagulate the latex by salting out. Thus, a thermoplastic resin containing a graft copolymer was separated. This thermoplastic resin was purified by thoroughly washing it with water and then drying it at 80° C. for 16 hours.

Subsequently, 57 parts of a powder of each of the above-obtained thermoplastic resins was mixed with 43 parts of a styrene-acrylonitrile copolymer (AS resin) obtained by emulsion polymerization of styrene monomer and acrylonitrile monomer in a weight ratio of 75:25, thereby to prepare a thermoplastic resin composition. This thermoplastic resin composition was extruded into pellets using a twin-screw extruder at a cylinder temperature of 230° C.

The results obtained are shown in Tables 5 to 7.

As is apparent from the Tables, the thermoplastic resin compositions obtained in accordance with the present invention (Examples 1 to 11) are superior in weatherability, sliding properties, impact resistance, and appearance.

In contrast, the compositions of Comparative Examples 1 and 2 are considerably inferior in impact resistance, appearance, and sliding properties, while the compositions of Comparative Examples 3 and 4 are inferior in impact resistance and sliding properties.

EXAMPLES 12 AND 13

Thermoplastic resin compositions were prepared and evaluated in the same manner as in Example 1 except that the vinyl monomers (Iv) to be grafted onto modified polyorganosiloxanes (III) were changed as shown in Table 6 and that the resin to be blended with thermoplastic resins obtained was changed as shown in Table 6.

The results obtained are shown in Table 6.

As is apparent from the table, the thermoplastic resin compositions obtained in accordance with the present invention are superior in weatherability, sliding

TABLE 5

|  | Example | | | | | | |
|---|---|---|---|---|---|---|---|
|  | 1 | 2 | 3 | 4 | 5 | 6 | 7 |
| Components used for preparing Component (IV) (parts) | | | | | | | |
| Component (III) Latex (35 parts in terms of solid matter amount) | A-1 | A-2 | A-3 | A-4 | A-5 | A-6 | A-7 |
| Styrene | 46.5 | 46.5 | 46.5 | 46.5 | 46.5 | 46.5 | 46.5 |
| Acrylonitrile | 18.5 | 18.5 | 18.5 | 18.5 | 18.5 | 18.5 | 18.5 |
| Methyl Methacrylate | — | — | — | — | — | — | — |
| Formulation for Thermoplastic Resin Composition (%) | | | | | | | |
| Thermoplastic Resin (V) | 57 | 57 | 57 | 57 | 57 | 57 | 57 |
| AS Resin [ST/AN = 75/25(%)] | 43 | 43 | 43 | 43 | 43 | 43 | 43 |
| Polystyrene | — | — | — | — | — | — | — |
| Poly(methyl methacrylate) | — | — | — | — | — | — | — |
| Evaluation | | | | | | | |
| Graft Ratio of Component (V) (%) | 101 | 80 | 52 | 61 | 65 | 95 | 51 |
| Properties of Thermoplastic Resin Composition | | | | | | | |
| Izod Impact Strength | 25 | 23 | 22 | 23 | 23 | 25 | 23 |
| Izod Impact Strength after Weathering | 24 | 22 | 21 | 22 | 22 | 24 | 22 |
| Falling Weight Impact Strength | 320 | 310 | 305 | 308 | 310 | 320 | 310 |
| Gloss | 85 | 83 | 82 | 82 | 82 | 85 | 83 |
| Kinetic Friction Coefficient | 0.1 | 0.1 | 0.1 | 0.1 | 0.1 | 0.1 | 0.1 |
| Specific Abrasion Loss ($\times 10^{-2}$) | 2 | 2 | 3 | 2 | 2 | 2 | 3 |

TABLE 6

|  | Example | | | | | |
|---|---|---|---|---|---|---|
|  | 8 | 9 | 10 | 11 | 12 | 13 |
| Components used for preparing Component (IV) (parts) | | | | | | |
| Component (III) Latex (35 parts in terms of solid matter amount) | A-8 | A-9 | B-1 | B-2 | A-3 | A-3 |
| Styrene | 46.5 | 46.5 | 46.5 | 46.5 | — | 65 |
| Acrylonitrile | 18.5 | 18.5 | 18.5 | 18.5 | — | — |
| Methyl Methacrylate | — | — | — | — | 65 | — |
| Formulation for Thermoplastic Resin Composition (%) | | | | | | |
| Thermoplastic Resin (V) | 57 | 57 | 57 | 57 | 57 | 57 |
| AS Resin [ST/AN = 75/25(%)] | 43 | 43 | 43 | 43 | — | — |
| Polystyrene | — | — | — | — | — | 43 |
| Poly(methyl methacrylate) | — | — | — | — | 43 | — |
| Evaluation | | | | | | |
| Graft Ratio of Component (V) (%) | 96 | 93 | 35 | 35 | 51 | 52 |
| Properties of Thermoplastic Resin Composition | | | | | | |
| Izod Impact Strength | 25 | 25 | 25 | 23 | 15 | 18 |
| Izod Impact Strength after Weathering | 24 | 24 | 24 | 22 | 14 | 17 |
| Falling Weight Impact Strength | 320 | 320 | 310 | 310 | 210 | 250 |
| Gloss | 85 | 85 | 80 | 80 | 88 | 81 |
| Kinetic Friction Coefficient | 0.1 | 0.1 | 0.1 | 0.1 | 0.1 | 0.1 |
| Specific Abrasion Loss ($\times 10^{-2}$) | 2 | 2 | 3 | 2 | 2 | 2 |

TABLE 7

|  | Comparative Example | | | |
|---|---|---|---|---|
|  | 1 | 2 | 3 | 4 |
| Components used for preparing Component (IV) (parts) | | | | |
| Component (III) Latex (35 parts in terms of solid matter amount) | A-10 | A-11 | A-12 | B-3 |
| Styrene | 46.5 | 46.5 | 46.5 | 46.5 |
| Acrylonitrile | 18.5 | 18.5 | 18.5 | 18.5 |
| Methyl Methacrylate | — | — | — | — |

TABLE 7-continued

|  | Comparative Example | | | |
|---|---|---|---|---|
|  | 1 | 2 | 3 | 4 |
| Formulation for Thermoplastic Resin Composition (%) | | | | |
| Thermoplastic Resin (V) | 57 | 57 | 57 | 57 |
| AS Resin [ST/AN = 75/25(%)] | 43 | 43 | 43 | 43 |
| Polystyrene | — | — | — | — |
| Poly(methyl methacrylate) | — | — | — | — |
| Evaluation | | | | |
| Graft Ratio of Component (V) (%) | 0 | 2 | 120 | 35 |
| Properties of Thermoplastic Resin Composition | | | | |
| Izod Impact Strength | 1 | 1 | 5 | 11 |
| Izod Impact Strength after Weathering | 1 | 1 | 4 | 10 |
| Falling Weight Impact Strength | 10 | 15 | 50 | 100 |
| Gloss | 25 | 27 | 80 | 80 |
| Kinetic Friction Coefficient | 0.1 | 0.1 | 0.1 | 0.1 |
| Specific Abrasion Loss ($\times 10^{-2}$) | 20 | 20 | 2 | 2 |

While the invention has been described in detail and with reference to specific embodiments thereof, it will be apparent to one skilled in the art that various changes and modifications can be made therein without departing from the spirit and scope thereof.

What is claimed is:

1. A process for producing a thermoplastic resin which comprises graft-polymerizing at least one vinyl monomer (IV) onto a modified polyorganosiloxane (III) obtained by condensation of from 90 to 99.8% by weight of an organosiloxane (I) having a structural unit represented by the formula $R^1{}_nSiO_{(4-n)/2}$, wherein $R^1$ represents a hydrocarbon group, phenyl group or hydrocarbon group substituted by halogen or a cyano group and n is an integer of from 0 to 3, and from 10 to 0.2% by weight of a graft crosslinking agent (II) containing an alkoxysilane structure and having an azo group or disulfide group, the sum of said organosiloxane (I) and said graft crosslinking agent (II) being 100% by weight.

2. A process as claimed in claim 1, wherein said graft crosslinking agent (II) contains an alkoxysilane structure and has an azo group.

3. A process as claimed in claim 1, wherein said graft crosslinking agent (II) is at least one member selected from the group consisting of 2-azoisobutyronitrile-2-cyanopropylmethyldimethoxysilane and 2-(trimethylthiuram disulfied)ethylmethyldimethozysilane.

4. A process as claimed in claim 1, wherein said organosiloxane (I) is at least one member selected from the group consisting of hexamethylcyclotrisiloxane, octamethyl-cyclotetrasiloxane, decamethylcyclopentasiloxane, dodecamethylcyclohexasiloxane, and trimethyltriphenylcyclotrisiloxane.

5. A process as claimed in claim 1, wherein the amount of said graft crosslinking agent (II) is from 0.5 to 5% by weight.

6. A process as claimed in claim 1, wherein said vinyl monomer (IV) is at least one member selected from the group consisting of an aromatic alkenyl compound, a methacrylic ester, an acrylic ester, a vinyl cyanide compound, an olefin, a conjugated diene, acrylic acid, methacrylic acid, a maleimide compound, and maleic anhydride.

7. A process as claimed in claim 1, wherein said vinyl monomer (IV) comprises from 65 to 75% by weight of styrene and from 25 to 35% by weight of acrylonitrile.

8. A process as claimed in claim 1, wherein the amount of said modified polyorganosiloxane (III) is from 5 to 80% by weight and the amount of said vinyl monomer (IV) is from 95 to 20% by weight, the sum of (III) and (IV) being 100%.

9. A process as claimed in claim 8, wherein the amount of said modified polyorganosiloxane (III) is from 10 to 60% by weight and the amount of said vinyl monomer (IV) is from 90 to 40% by weight.

10. A process as claimed in claim 1, wherein the thermoplastic resin has a graft ratio of 80% by weight or more.

11. A process as claimed in claim 1, wherein the thermoplastic resin has an intrinsic viscosity as measured in methyl ethyl ketone of from 0.2 to 0.8.

* * * * *